Nov. 17, 1959     R. H. ATKINSON     2,913,297

METHOD FOR LAMP MANUFACTURE

Filed March 31, 1958

40 VOLTS A.C.

*INVENTOR.*
RUSSEL H. ATKINSON.

BY *W. D. Palmer*

ATTORNEY.

United States Patent Office 2,913,297
Patented Nov. 17, 1959

2,913,297

METHOD FOR LAMP MANUFACTURE

Russell H. Atkinson, Fanwood, N.J., assignor to Westinghouse Electric Corporation, East Pittsburgh, Pa., a corporation of Pennsylvania Application March 31, 1958, Serial No. 725,024

5 Claims. (Cl. 316—25)

This invention relates to incandescent lamps and, more particularly, to a method for manufacturing incandescent lamps wherein the lamp performance is improved.

In the manufacture of incandescent lamps it is desirable to remove or to render ineffective any unwanted impurity contained within the lamp envelopes. Water is the most prevalent and detrimental of unwanted impurities normally present within the lamp envelopes, which water may occur on the surface of or within the vitreous envelope itself, or may be introduced with the lead-conductors, or with the gas flush or gas fill for example. While other impurities such as oxygen and carbon dioxide are also objectionable, water is particularly detrimental to incandescent lamps in that it sets up the so-called water-cycle with the tungsten filament. In this water cycle, even very minute quantities of water react with the tungsten filament during lamp operation to form tungstic oxide and atomic hydrogen. The tungstic oxide is carried as a gas from the tungsten filament to the envelope wall where it deposits. The atomic hydrogen formed reacts with the deposited tungstic oxide to form metallic tungsten and more water, which again reacts with the tungsten filament to complete the water cycle.

In the usual gas-filled incandescent lamps, a substantial portion of deposited tungsten, which manifests itself in the form of blackened bulbs, apparently is deposited through chemical interaction in accordance with the aforementioned water cycle. This deposited tungsten not only decreases the light transmission through the envelope, but also results in shortened lamp life through the gradual dissipation of the tungsten filament.

In order to minimize the deleterious effects of impurities and to minimize as much as possible the chemical interaction of the aforementioned water cycle, gettering materials have been placed within the lamp envelope to improve the lamp performance. One of the most-frequently-used gettering materials is zirconium, which may be placed on the lamp lead conductors proximate the filament in order that the zirconium is exposed to a relatively high temperature during operation of the lamp to enhance its gettering abilities. An additional technique which has been utilized has been to place a gettering material such as zirconium in parallel with the lamp lead conductors. This zirconium is then electrically flashed-off before the lamp is operated. Other gettering materials such as phosphorus have also been used.

In the radio tube art, it has been customary to place a gettering material such as barium within the tube envelope and to flash-off this barium after the tube has been fabricated. The flashing barium tends to react with residual amounts of impurities remaining within the tube envelope.

While all of the foregoing technique for gettering have some beneficial effects, none of them have been as effective as desired. Apparently the main drawbacks to the aforementioned prior-art gettering techniques are due to the fact that some of the impurities, and particularly water, are either bound to or contained within the component parts comprising the lamp and on flashing, etc., the affinity of the lamp component parts for the impurities is sufficient to prevent their being removed or otherwise rendered ineffective by the getter. During the life of the lamp, however, these impurities are gradually released by the lamp component parts and tend to react with the incandescent filament to set up the so-called water cycle, for example. The gettering material which may be incorporated in the lamps, such as zirconium for example, reacts with some of these impurities, but an appreciable portion are not gettered and the performance of the lamps is correspondingly deleteriously effected.

In order to inhibit as much as possible the presence of unwanted impurities, and particularly water, very elaborate precautions have been taken in fabricating incandescent lamps, such as maintaining the lamp leads, etc., as free as possible of contamination and purifying as much as possible the flush and fill gases. This involves considerable expense and in spite of elaborate precautions, the lamp performance still leaves much to be desired.

It is the general object of this invention to avoid and overcome the foregoing and other difficulties of and objections to prior-art practices by the provision of a method for processing incandescent lamps wherein substantially all unwanted contaminations, particularly water, included within the lamp envelope are rendered ineffective, in order to improve the performance of the incandescent lamps.

It is a further object to provide a method for improving the performance of incandescent lamps without the usual elaborate precautions required for keeping the lamp component parts and fill and flush gases as free as possible from contamination.

The aforesaid objects of the invention, and other objects which will become apparent as the description proceeds, are achieved by placing a gettering member in parallel with the incandescible filament and within the sealed lamp envelope. The gettering member is energized to a very hot condition and the lamp is simultaneously lehred. The simultaneous lamp lehring and gettering-member heating causes substantially all unwanted impurities to be driven into the volume within the lamp envelope, where the hot gettering member reacts with such unwanted impurities to render them ineffective to impair the performance of the lamp.

For a better understanding of the invention, reference should be had to the accompanying drawing wherein.

Figure 1:
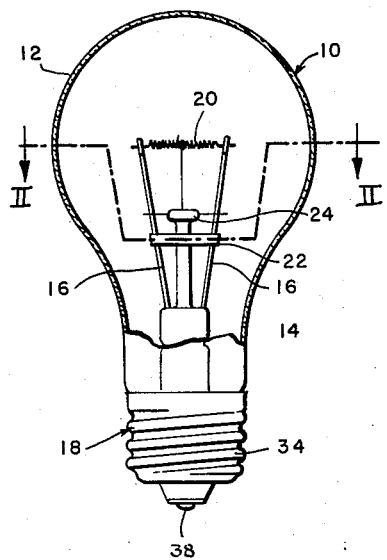
Fig. 1 is an elevational view, partly in section, of an incandescent lamp before processing in accordance with the present method, which lamp is provided with a gettering member paralleling the incandescible filament.
Figure 2:
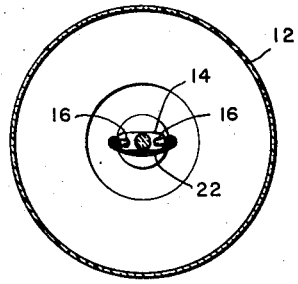
Fig. 2 is a cross-sectional view taken on the line II—II in Fig. 1 in the direction of the arrows.

With specific reference to the form of the invention illustrated in the drawing, the lamp 10 as shown in Fig. 1 is a standard 100 watt gas-filled lamp designed for operation from a 110 volt line and generally comprises a light-transmitting vitreous envelope 12, conventional reentrant stem press 14 sealed at the neck of the envelope 12 and filament-supporting lead conductors 16 sealed through the reentrant stem press 14 and electrically connecting to the lamp base 18. The envelope 12 may be clear or may have an inside-frost or other light-diffusing medium. An incandescible filament 20 electrically connects between the inwardly-extending extremities of the lead conductors 16 within the envelope 12 and such a filament is normally fabricated of coiled or coiled-coil tungsten as is usual, although the filament may be fabricated of other suitable refractory metal if desired. A gettering member 22 electrically connects between the lead conductors so as to parallel the filament. In the embodiment as shown, the gettering member 22 is positioned intermediate the arbor button 24 and the stem press 14. The positioning of this gettering member is not critical and may be varied as long as it is positioned within the lamp envelope 12 and electrically parallels the filament 20.

The gettering member 22 comprises a metal of periodic group 2A such as beryllium, magnesium, calcium, strontium or barium, or a transition metal of period groups 4 and 5 such as titanium, zirconium, hafnium, vanadium, niobium or tantalum, or mixtures or alloys of any of these metals such as equal parts by weight of barium and strontium or equal parts by weight of titanium and zirconium. The gettering member 22 may also comprise thorium. In addition, these aforementioned gettering metals may be admixed in any proportion as desired. The preferred gettering metal is zirconium. The zirconium or other gettering metal may be provided with any suitable form although the preferred form is that of a strip of the metal. All of the aforementioned gettering metals and their alloys form oxides readily and the formed oxides are stable to hydrogen at temperatures which approach the melting points of these gettering metals.

Figure 3:
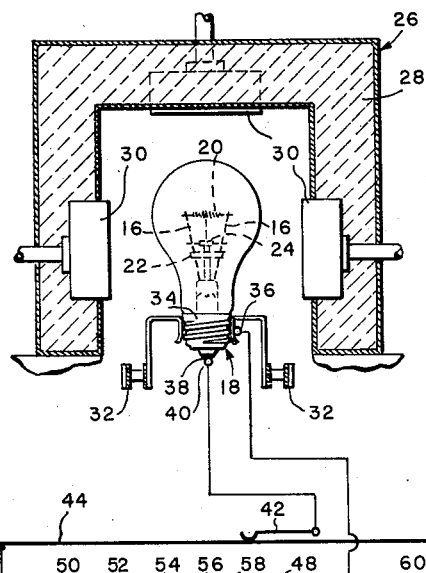
Fig. 3 is a cross-sectional view of a lehring tunnel illustrating the lamp-lehring operation, with the voltage supply means utilized in the lehring operation shown in diagrammatic form.

Before processing in accordance with the instant method, the lamp is first fabricated in accordance with the usual techniques, except that the additional gettering member 22 is electrically connected between the lead conductors as shown in Fig. 1, such by crimping for example. It is desirable to completely fabricate the lamp 10 before processing to remove impurities although if desired, the lamp can be processed to remove impurities before the lamp base 18 is affixed to the envelope 12. After the lamp has been fabricated as shown in Fig. 1, it is placed on a suitable conveyor and carried through a lehring means 26 shown in cross-sectional view in Fig. 3. The lehring means 26 generally comprises a conventional tunnel 28 which is desirably thermally insulated to minimize heat losses. The tunnel 28 is provided with heating means which desirably comprises electrical-type heaters 30, although gas heaters could be utilized if desired. The lamps are advanced through the lehring tunnel 28 by any suitable conveyor means such as a standard chain conveyor 32.

The lamp lehring temperature is between 350° C. to the strain point of the vitreous envelope 12. Between these temperature limitations the impurities contained on and within the component parts comprising the lamp 10 are driven off in a rapid fashion and into the volume defined by the lamp envelope 12, where they may readily be gettered by the gettering member 22. Simultaneous with the lamp lehring, the gettering member 22 is heated to a temperature of at least about 0.6 and preferably about 0.8 of the absolute melting temperature of the metal comprising the gettering member. If desired the gettering member can be heated to a temperature of more than about 0.8 of the absolute melting temperature of the metal comprising the gettering member and such higher temperature is only limited by the possibility of premature burn-out of the gettering member. At temperatures less than about 0.6 of the absolute melting temperature of the metal comprising the gettering member, the gettering rate is sufficiently slow as to make the use of such temperatures impractical.

The gettering member 22 is provided with a low electrical resistance as compared to the electrical resistance of the incandescible filament 20 so that the gettering member can be heated to the indicated temperatures without appreciably energizing the incandescible filament.

The design and construction of the gettering member 22 may readily be calculated from the following formula. In setting forth the parameters included in this formula, the preferred specific example which has the form of zirconium strip measuring 2 cm. x 0.2 cm. x 0.005 cm. is carried through in detail.

$$E^2 = \epsilon K A_s T^4 \rho_0 (1+\alpha \Delta T) \frac{l}{A_x}$$

Note:
$E$=voltage required to cause the gettering member to be heated to desired temperature
$\epsilon$=total thermal emissivity of gettering member=0.2 for Zr
$K$=Stefan-Boltzman radiation constant=$5.67 \times 10^{-12}$ watts/cm.²/deg.⁴.
$A_s$=surface area of gettering member=0.82 cm.²
$T$=preferred temperature in °K for gettering member=1740
$T^4$=$9.27 \times 10^{12}$
$\rho_0$=resistivity at 0° C.=$41 \times 10^{-6}$ ohm-cm.
$\alpha$=temperature coeff. of resis.=$4.4 \times 10^{-3}$ for Zr
$\Delta T$=temp. in degrees C.=1467
$l$=length of getter member=2 cm.
$A_x$=cross-sectional area of gettering member=0.001 cm.²

In the case the gettering member 22 comprises zirconium, the temperature to which the zirconium is heated should be at least about 1130° C. and is preferably about 1470° C. The voltage required to heat the zirconium strip as specified hereinbefore to the preferred gettering temperature is calculated by the foregoing formula as approximately 2.3 volts and this calculated voltage figure has been confirmed experimentally. It has been found that as the gettering member reacts with the impurities, and particularly the water, which are driven into the volume defined by the envelope, a slightly higher voltage will be required to maintain the gettering member at the preferred temperature. This appears to be due to the formation of oxides which increases somewhat the resistance of the gettering member. Accordingly, it is desirable although not necessary to increase the voltage slightly as the lamp progresses through the lehring tunnel 28.

Figure 4:
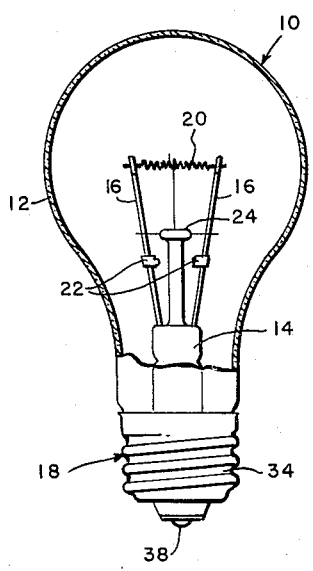
Fig. 4 is an elevational view, partly in section, of a complete-processed lamp.
Figure 4:
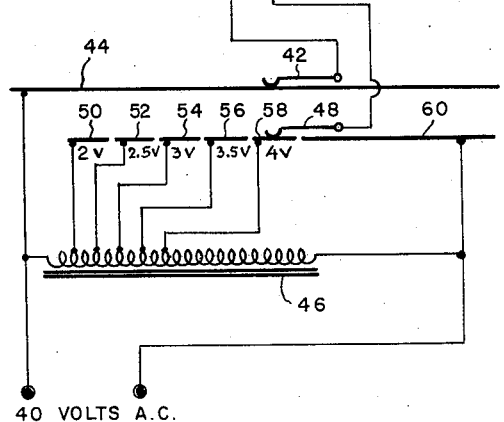

Energization of the gettering member 22 with an increasing voltage is readily accomplished by means of progressing electrode rails which are respectively electrically connected across a progressively-increasing number of turns of an auto-transformer. In explanation, when the lamp as shown in Fig. 1 is placed onto the conveyor 32, the shell portion 34 of the lamp base 18 contacts a first electrical contact 36 and the eyelet portion 38 of the lamp base 18 contacts a second electrical contact 40. The contact 40 is electrically connected to a shoe 42 which rides on an electrode rail 44, which is connected to one side of the autotransformer 46. The other contact 36 connects to a shoe 48 which is adapted to contact in sequence a series of electrode rails 50, 52, 54, 56 and 58. These electrode rails are in turn connected to individual taps on the autotransformer 46 to provide a gradually-increasing voltage between the contacts 36 and 40. As an example, the first electrode rail 50 is maintained at a potential of 2 volts with respect to electrode rail 44 and the additional electrode rails 52 through 58 carry potentials which increase in one-half volt steps, for example. Thus as the lamp passes through the lehring tunnel 28, the shoe 48 passes from electrode rail 50 to electrode rail 52, etc. When the lamp has completely passed the lehring tunnel the shoe 48 contacts the electrode rail 60 so that the full autotransformer potential of 40 volts, for example, is applied across the lamp lead conductors 16. This potential is sufficient to cause the gettering member 22 to burn out as by melting, but is insufficient to cause the incandescible filament to burn out, since the incandescible filament in the usual lamp is normally designed for operation with 110 volts. It is desirable although not necessary to maintain the gettering member "burn out potential" comparatively low in order that the gettering material is not flashed off in a violent fashion so as to contaminate the inner surface of the lamp envelope. The completely-processed lamp is shown in Fig. 4, including the remaining portions of the burned-out gettering member.

Energization of the gettering member 22 in a manner as specified without the simultaneous lehring of the lamp will not improve the lamp performance to any appreciable degree, inasmuch as the impurities which are held by the lamp component parts will not be released without the simultaneous lamp lehring. Thus the indicated lehring temperatures of between 350° C. to the strain point of the vitreous envelope are required to cause the impurities, and particularly the water, to be driven in a rapid fashion into the volume defined by the envelope 12. The maximum temperature at which the lamp can be lehred is limited as a practical matter by the strain point of the material which comprises the vitreous envelope. In the case of the customary soda-lime glass, the strain point is about 500° C. With other types of glasses, the strain point will vary considerably and the maximum usable temperature will vary accordingly. In some cases the strain point of the vitreous envelope can be exceeded during the lamp lehring, but on a production basis this often leads to troubles. The time which the lamp is lehred with the simultaneous energization of the gettering member should be at least one-half minute. This lamp-lehring time can be extended considerably and in the case of very large lamp types, it may be desirable to extend the lamp lehring and gettering period to as much as three to five minutes. In the case of very small miniature-type lamps, however, the gettering and lehring period desirably approaches the minimum-specified time, due to commercial factors.

While the preferred form of the gettering member 22 is that of a strip in order that the maximum-possible area is provided with the minimum amount of gettering metal, the gettering member may also have other configurations and may be fabricated of wire or coiled wire, for example. In addition, the gettering member may comprise a base metal such as nickel, for example, having the specified gettering metal such as zirconium placed thereon in powdered form or it may comprise a metallic base member such as nickel having the gettering metal coated thereon. Also, any of the listed gettering metals may be substituted for the preferred zirconium. The desired design characteristics for the gettering member which incorporates these alternative gettering metals may be readily calculated from the aforementioned formula. As a further alternative, the gettering metals as specified hereinbefore may be alloyed or they may be admixed and applied in powdered form to a base metal such as nickel.

In controlled tests to prove the instant process, lamps were fabricated with the gettering member 22 positioned within the lamp envelope 12 as shown in Fig. 1. The exhaust given the lamps before the gas fill was inserted was very poor leaving a high impurity content, especially water, within the sealed envelope. Thereafter one lot of these "poor lamps" was processed with the present method in a manner as specified hereinbefore. The other lot of lamps was not lehred but merely had the gettering element burned out. The foregoing lamps were then tested in an oven at a temperature of 350° C. to accelerate the water cycle and effects of other undesirable impurities. The lamps which were not processed by the instant method had maximum life of from 10 to 20 hours and at failure, the inside of the envelope was contaminated with tungsten and tungstic oxide, since undesirable impurities were present in a sufficient amount that the filament burned out before all of the deposited tungstic oxide could be converted to tungsten. The lamps which were processed by the instant method burned to full rated life of 750 hours with only a slight amount of deposited tungsten present on the envelope at the end of life. The amount of deposited tungsten was so slight that it was primarily attributed to the normal evaporation of tungsten from the filament. Control lamps which were taken from actual factory production were also burned in the same oven for their rated life. At the end of life, these lamps had a considerably-greater amount of tungsten deposited on the envelope than the lamps which were processed by the instant method.

It will be recognized that the objects of the invention have been achieved by providing a method for processing incandescent lamps wherein substantially all unwanted contaminations, and particularly water, included with the lamp envelopes are rendered ineffective to impair the performance of the lamps. In addition, there has been provided a method for improving the performance of incandescent lamps without the usual precautions required for keeping the lamp component parts and fill and flush gases as free as possible from contamination.

In the foregoing description, a specific embodiment has been carried through in detail for a lamp designed to be operated from a 110 volt line. The instant process is also applicable to miniature-type lamps designed to be operated on low voltage as well as to vacuum lamps of all types. In some cases this necessitates redesign of the gettering member, and such redesign is readily accomplished in accordance with the foregoing formula.

While one best-known embodiment of the invention has been illustrated and described in detail, it is to be particularly understood that the invention is not limited thereto or thereby.

I claim:

1. The method of gettering impurities from a sealed incandescent lamp having, a light-transmitting vitreous envelope, lead conductors sealed through said envelope, an incandescible filament supported between said lead conductors within said envelope, and a gettering member connecting between said lead conductors within said envelope and having a substantially lower electrical resistance than said incandescible filament, said gettering member comprising a material of at least one metal of the group consisting of periodic group 2A, the transition metals of periodic groups 4 and 5 and thorium, said method comprising: applying a relatively low potential between said lead conductors to cause said gettering member to heat to a temperature of at least about 0.6 of the absolute melting temperature of the metal comprising said gettering member; simultaneous with said gettering-member heating, lehring said envelope at a temperature of between 350° C. to the strain point of said vitreous envelope; maintaining said gettering-member heating and said envelope lehring for at least one-half minute; and thereafter applying between said lead conductors an electrical potential sufficient to cause said gettering member to burn out but insufficient to cause said incandescible filament to burn out.

2. The method of gettering impurities from a sealed incandescent lamp having, a light-transmitting vitreous envelope, lead conductors sealed through said envelope, an incandescible filament supported between said lead conductors within said envelope, and a gettering member connecting between said lead conductors within said envelope and having a substantially lower electrical resistance than said incandescible filament, said gettering member comprising a material of at least one metal of the group consisting of periodic group 2A, the transition metals of periodic groups 4 and 5 and thorium, said method comprising: applying a relatively low potential between said lead conductors to cause said gettering member to heat to a temperature of about 0.8 of the absolute melting temperature of the metal comprising said gettering member; simultaneous with said gettering-member heating, lehring said envelope at a temperature of between 350° C. to the strain point of said vitreous envelope; maintaining said gettering-member heating and said envelope lehring for at least one-half minute; and thereafter applying between said lead conductors an electrical potential sufficient to cause said gettering member to burn out but insufficient to cause said incandescible filament to burn out.

3. The method of gettering impurities from a sealed incandescent lamp having a light-transmitting vitreous envelope with lead conductors sealed therethrough and supporting an incandescible filament therebetween within said envelope and additionally having connected between said lead conductors within said envelope a gettering member comprising zirconium and having a substantially lower electrical resistance than said incandescible filament, which method comprises applying a relatively low potential between said lead conductors to cause said gettering member to heat to a temperature of at least about 1130° C., simultaneous with said gettering-member heating lehring said lamp at a temperature of between 350° C. to the strain point of said vitreous envelope, maintaining said gettering-member heating and said envelope lehring for at least one-half minute, and thereafter applying between said lead conductors a potential sufficient to cause said gettering member to burn out but insufficient to cause said incandescible filament to burn out.

4. The method of gettering impurities from a sealed incandescent lamp having a light-transmitting vitreous envelope with lead conductors sealed therethrough and supporting an incandescible filament therebetween within said envelope and additionally having connected between said lead conductors within said envelope a gettering member comprising zirconium and having a substantially lower electrical resistance than said incandescible filament, which method comprises applying a relatively low potential between said lead conductors to cause said gettering member to heat to a temperature of about 1470° C., simultaneous with said gettering-member heating lehring said lamp at a temperature of between 350° C. to the strain point of said vitreous envelope, maintaining said gettering-member heating and said envelope lehring for at least one-half minute, and thereafter applying between said lead conductors a potential sufficient to cause said gettering member to burn out but insufficient to cause said incandescible filament to burn out.

5. The method of gettering impurities from a sealed incandescent lamp having a light-transmitting vitreous envelope with lead conductors sealed therethrough and supporting an incandescible filament therebetween within said envelope and additionally having connected between said lead conductors within said envelope a gettering member comprising a thin strip of zirconium and having a substantially lower electrical resistance than said incandescible filament, which method comprises applying a relatively low potential between said lead conductors to cause said gettering member to heat to a temperature of about 1470° C., simultaneous with said gettering member heating lehring said lamp at a temperautre of between 350° C. to the strain point of said vitreous envelope, maintaining said gettering-member heating and said envelope lehring for at least one-half minute, and thereafter applying between said lead conductors a potential sufficient to cause said gettering member to burn out but insufficient to cause said incandescible filament to burn out.

References Cited in the file of this patent
UNITED STATES PATENTS

| | | |
|---|---|---|
| 2,412,302 | Spencer | Dec. 10, 1946 |
| 2,671,873 | Meier | Mar. 9, 1954 |
| 2,807,517 | Marschka et al. | Sept. 24, 1957 |